United States Patent
Yi

(10) Patent No.: US 11,290,146 B2
(45) Date of Patent: Mar. 29, 2022

(54) METHOD AND APPARATUS FOR SUPPORTING FLEXIBLE CARRIER AGGREGATION IN WIRELESS COMMUNICATION SYSTEM

(71) Applicant: LG Electronics Inc., Seoul (KR)

(72) Inventor: Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 16/764,035

(22) PCT Filed: Dec. 12, 2018

(86) PCT No.: PCT/KR2018/015760
§ 371 (c)(1),
(2) Date: May 14, 2020

(87) PCT Pub. No.: WO2019/117619
PCT Pub. Date: Jun. 20, 2019

(65) Prior Publication Data
US 2020/0280337 A1    Sep. 3, 2020

Related U.S. Application Data

(60) Provisional application No. 62/597,866, filed on Dec. 12, 2017.

(51) Int. Cl.
*H04W 4/00* (2018.01)
*H04B 1/7143* (2011.01)
(Continued)

(52) U.S. Cl.
CPC ......... *H04B 1/7143* (2013.01); *H04L 1/1819* (2013.01); *H04L 1/1861* (2013.01); *H04L 5/001* (2013.01)

(58) Field of Classification Search
CPC ... H04B 1/7143; H04L 1/1819; H04L 1/1861; H04L 5/001; H04L 5/0053; H04L 1/1812;
(Continued)

(56) References Cited

U.S. PATENT DOCUMENTS

2010/0272051 A1* 10/2010 Fu .................. H04L 5/0037
370/329
2011/0103243 A1* 5/2011 Larsson .............. H04L 5/001
370/252

(Continued)

OTHER PUBLICATIONS

3GPP TSG RAN WG1 Meeting #91 R1-1719380, Reno, USA, Nov. 27-Dec. 1, 2017 (Year: 2017).*
(Continued)

*Primary Examiner* — Atique Ahmed
(74) *Attorney, Agent, or Firm* — Dentons US LLP

(57) ABSTRACT

A method and apparatus for supporting a flexible carrier aggregation in a new radio access technology (RAT) system is provided. A user equipment (UE) reports UE capability for supporting a flexible carrier aggregation in a single cell to a network, receives a configuration of the flexible carrier aggregation from the network, and communicates with the network via multiple physical carriers configured by the flexible carrier aggregation. The multiple physical carriers may be mapped to the single cell by the flexible carrier aggregation. Or, one physical carrier may be mapped to multiple cells by the flexible carrier aggregation.

6 Claims, 17 Drawing Sheets

(51) Int. Cl.
*H04L 1/18* (2006.01)
*H04L 5/00* (2006.01)

(58) Field of Classification Search
CPC .............. H04W 72/042; H04W 76/27; H04W 72/0446
See application file for complete search history.

(56) References Cited

U.S. PATENT DOCUMENTS

| | | | |
|---|---|---|---|
| 2011/0268071 A1* | 11/2011 | Siew | H04L 5/003 370/329 |
| 2012/0069815 A1* | 3/2012 | Aiba | H04W 72/0413 370/329 |
| 2012/0113866 A1 | 5/2012 | Tenny et al. | |
| 2012/0307758 A1* | 12/2012 | Moon | H04L 5/0055 370/329 |
| 2013/0065589 A1* | 3/2013 | Lee | H04W 36/0022 455/436 |
| 2013/0121304 A1* | 5/2013 | Nory | H04B 7/04 370/330 |
| 2013/0176952 A1* | 7/2013 | Shin | H04W 72/042 370/329 |

OTHER PUBLICATIONS

Huawei et al., "Remaining issues on bandwidth part," R1-1719380, 3GPP TSG RAN WG1 Meeting #91, Reno, USA, Nov. 18, 2017, see sections 2-3.1; and tables 1, 4.

Mediatek Inc., "Summary of Bandwidth Part Operation," R1-1721504, 3GPP TSG RAN WG1 Meeting #91, Reno, USA, Nov. 29, 2017, see sections 2.1-4.1.

Intel Corporation, "Remaining details for bandwidth parts," R1-1720100, 3GPP TSG RAN WG1 Meeting #91, Reno, USA, Nov. 18, 2017, see sections 2-3.

* cited by examiner

FIG. 11
PHY-carrier 1
PHY-carrier 1
DL scheduling (PCC)
UL scheduling (PCC)

METHOD AND APPARATUS FOR SUPPORTING FLEXIBLE CARRIER AGGREGATION IN WIRELESS COMMUNICATION SYSTEM

This application is the National Stage filing under 35 U.S.C. 371 of International Application No. PCT/KR2018/015760, filed on Dec. 12, 2018, which claims the benefit of U.S. Provisional Application No. 62/597,866 filed on Dec. 12, 2017, the contents of which are all hereby incorporated by reference herein in their entirety.

TECHNICAL FIELD

The present invention relates to wireless communications, and more particularly, to a method and apparatus for supporting a flexible carrier aggregation in a new radio access technology (RAT) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR is a technology that operates on a very wideband compared with LTE. In order to support flexible broadband operation, NR has the following design principles different from LTE in terms of broadband support.

The ability of the network and the user equipment (UE) to support the bandwidth may be different.

The bandwidth capabilities of the downlink and uplink supported by the UE may be different.

The capabilities of the bandwidths supported by each UE may differ, so that UEs supporting different bandwidths may coexist within one network frequency band.

In order to reduce the power consumption of the UE, the UE may be configured with different bandwidth depending on the traffic load state of the UE, etc.

In order to satisfy the above-mentioned design principles, NR newly introduced a concept of bandwidth part (BWP) in addition to carrier aggregation (CA) of existing LTE.

SUMMARY

The present invention proposes different approaches of carrier aggregation mechanisms which can be used for efficient means for efficient battery consumption, efficient frequency diversity, and fast activation/deactivation of carriers.

In an aspect, a method performed by a user equipment (UE) in a wireless communication system is provided. The method includes reporting UE capability for supporting a flexible carrier aggregation in a single cell to a network, receiving a configuration of the flexible carrier aggregation from the network, and communicating with the network via multiple physical carriers configured by the flexible carrier aggregation. The multiple physical carriers are mapped to the single cell by the flexible carrier aggregation.

In another aspect, a user equipment (UE) in a wireless communication system is provided. The UE includes a memory, a transceiver, and a processor, operably coupled to the memory and the transceiver, that controls the transceiver to report UE capability for supporting a flexible carrier aggregation in a single cell to a network, controls the transceiver to receive a configuration of the flexible carrier aggregation from the network, and controls the transceiver to communicate with the network via multiple carriers configured by the flexible carrier aggregation. The multiple carriers are mapped to the single cell by the flexible carrier aggregation.

In another aspect, a method performed by a base station (BS) in a wireless communication system is provided. The method includes receiving user equipment (UE) capability for supporting a flexible carrier aggregation in a single cell from a UE, transmitting a configuration of the flexible carrier aggregation to the UE, and communicating with the UE via multiple physical carriers configured by the flexible carrier aggregation. The multiple physical carriers are mapped to the single cell by the flexible carrier aggregation.

Flexible carrier aggregation can be supported efficiently.

BRIEF DESCRIPTION OF THE DRAWINGS

FIG. 11 shows an example of supporting URLLC in TDD by flexible carrier aggregation according to an embodiment of the present invention.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
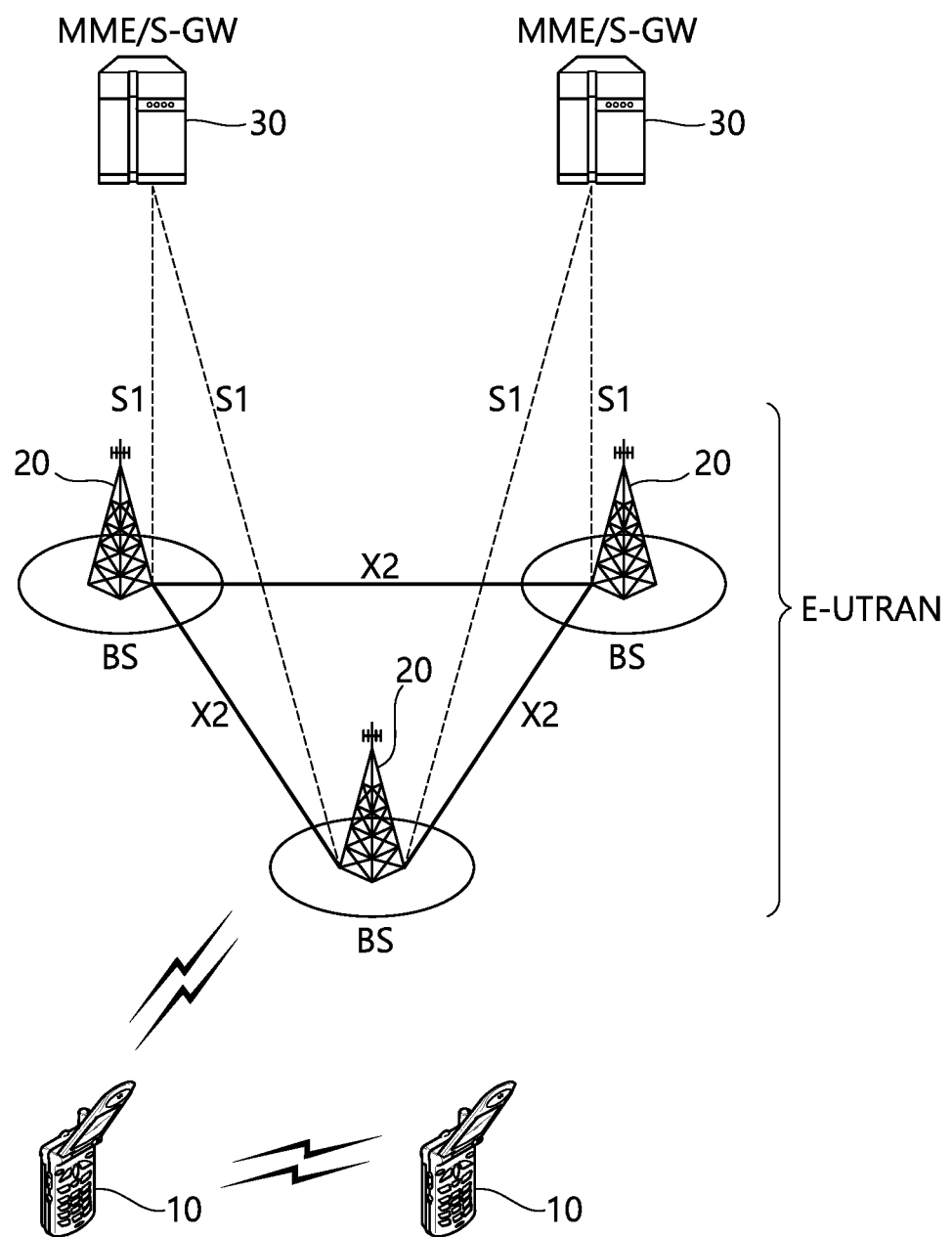
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc. The E-UTRAN consists of one or more base station (BS) 20. The BS 20 provides the E-UTRA user plane and control plane protocol terminations towards the UE 10.

The BS 20 is generally a fixed station that communicates with the UE 10. The BS 20 hosts the functions, such as inter-cell radio resource management (RRM), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
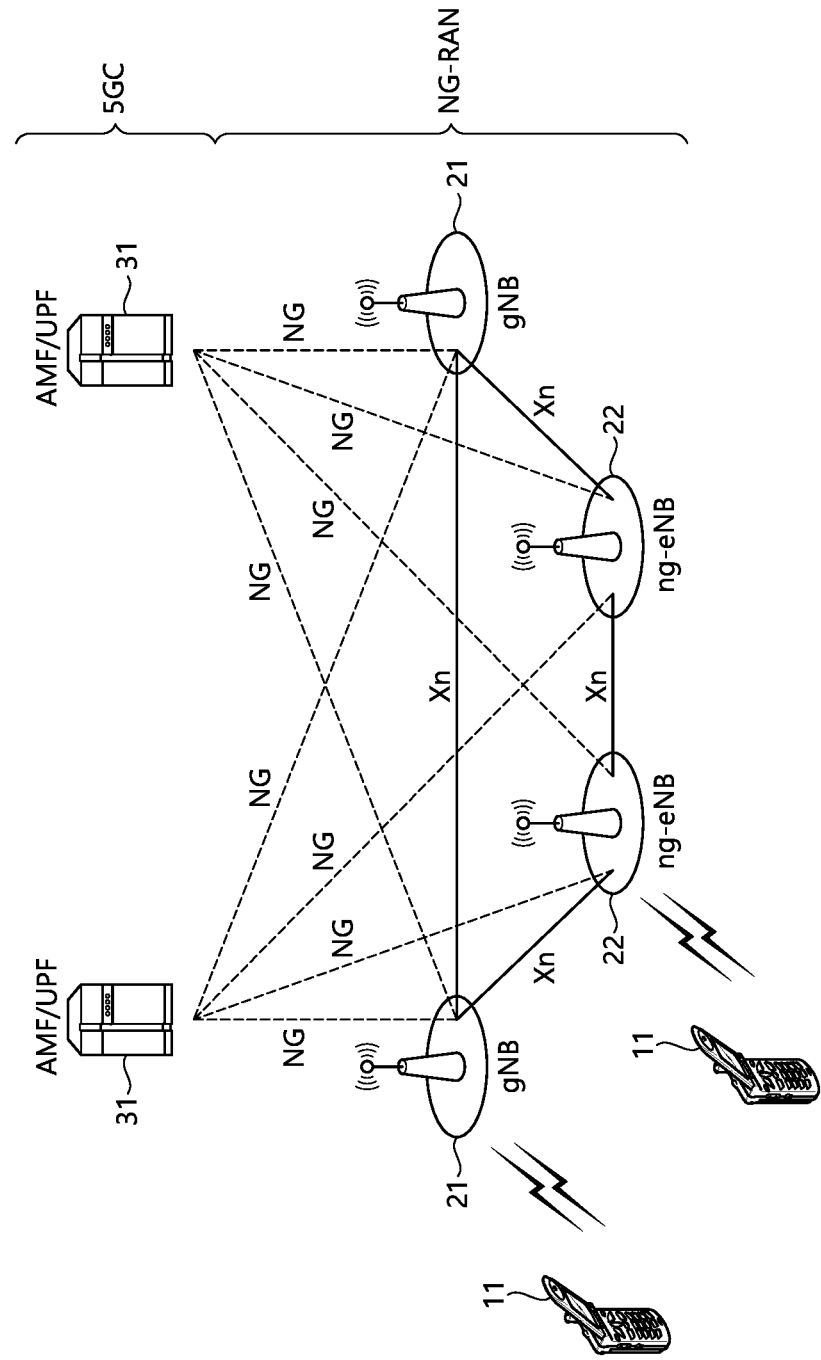
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW.

The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

Hereinafter, frame structure/physical resources in NR is described.

In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

In NR, DL and UL transmissions are performed over a radio frame with a duration of 10 ms. Each radio frame includes 10 subframes. Thus, one subframe corresponds to 1 ms. Each radio frame is divided into two half-frames.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| $\mu$ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index $\mu$. However, subcarrier spacings shown in Table 1 are merely exemplary, and specific subcarrier spacings may be changed. Therefore, each subcarrier spacing (e.g. $\mu$=0, 1 ... 4) may be represented as a first subcarrier spacing, a second subcarrier spacing ... Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

One subframe includes $N_{symb}^{subframe,\mu}=N_{symb}^{slot} * N_{slot}^{subframe,\mu}$ consecutive OFDM symbols. In NR, a number of slots and a number of symbols included in one radio frame/subframe may be different according to various numerologies, i.e. various subcarrier spacings.

Table 2 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in normal cyclic prefix (CP).

TABLE 2

| $\mu$ | Number of OFDM symbols per slot ($N_{symb}^{slot}$) | Number of slots per radio frame ($N_{symb}^{frame,\mu}$) | Number of slots per subframe ($N_{symbsub}^{frame,\mu}$) |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to $\mu$=0 is applied, one radio frame includes 10 subframes, one subframe includes to one slot, and one slot consists of 14 symbols.

Table 3 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in extended CP.

TABLE 3

| $\mu$ | Number of OFDM symbols per slot ($N_{symb}^{slot}$) | Number of slots per radio frame ($N_{symb}^{frame,\mu}$) | Number of slots per subframe ($N_{symbsub}^{frame,\mu}$) |
|---|---|---|---|
| 2 | 12 | 40 | 4 |

Referring to Table 3, $\mu$=2 is only supported in extended CP. One radio frame includes 10 subframes, one subframe includes to 4 slots, and one slot consists of 12 symbols.

In the present specification, a symbol refers to a signal transmitted during a specific time interval. For example, a symbol may refer to a signal generated by 01-DM processing. That is, a symbol in the present specification may refer to an OFDM/OFDMA symbol, or SC-FDMA symbol, etc. A CP may be located between each symbol.

Figure 3:
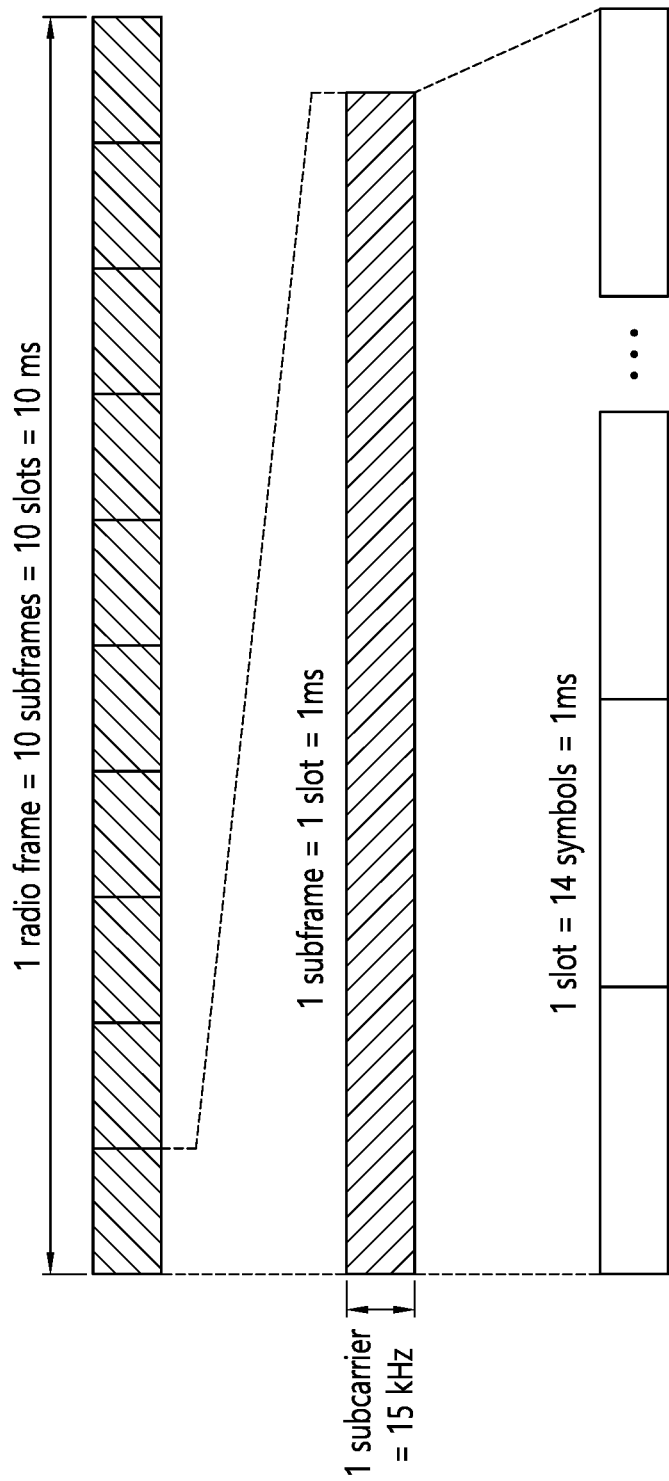
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to $\mu$=0.

Figure 4:
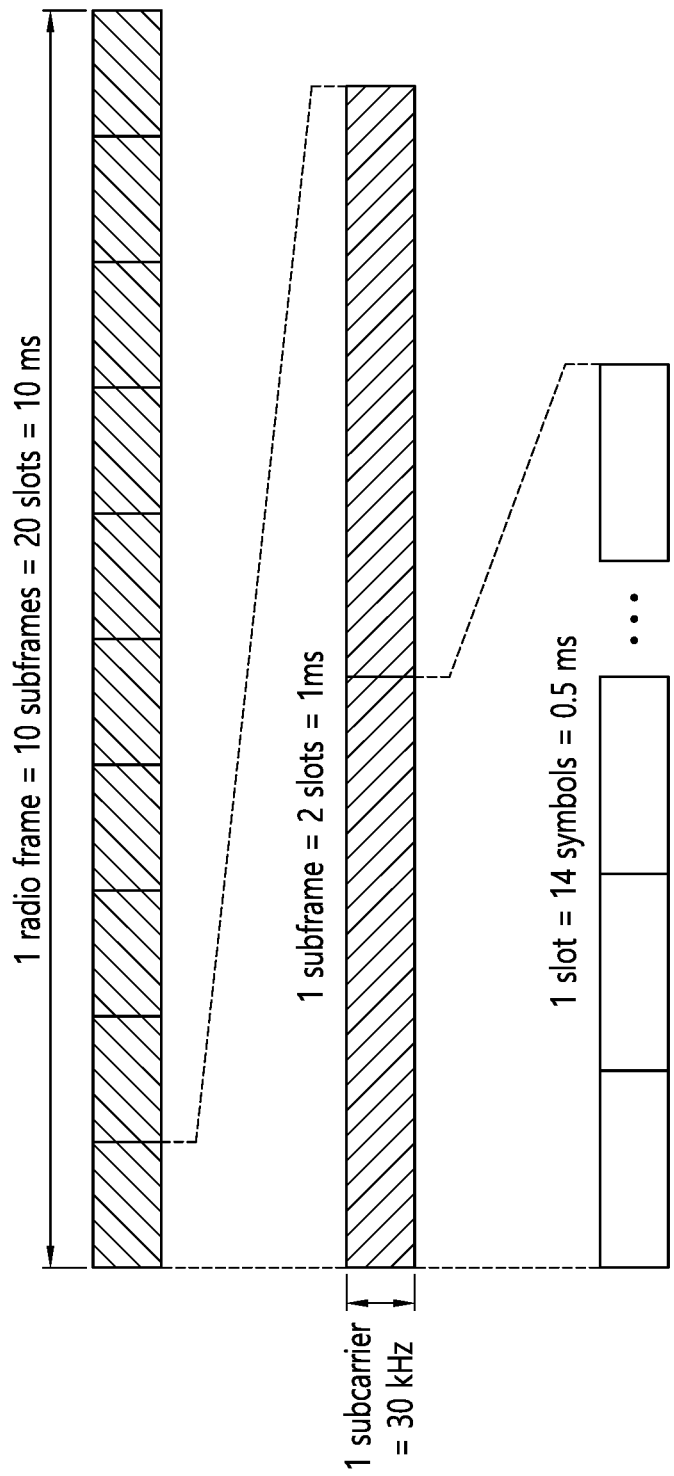
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to $\mu$=1.

Meanwhile, a frequency division duplex (FDD) and/or a time division duplex (TDD) may be applied to a wireless communication system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols. The flexible symbol may be referred to as another terminology, such as reserved symbol, other symbol, unknown symbol, etc.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| ... | | | | | | | | | | | | | | |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
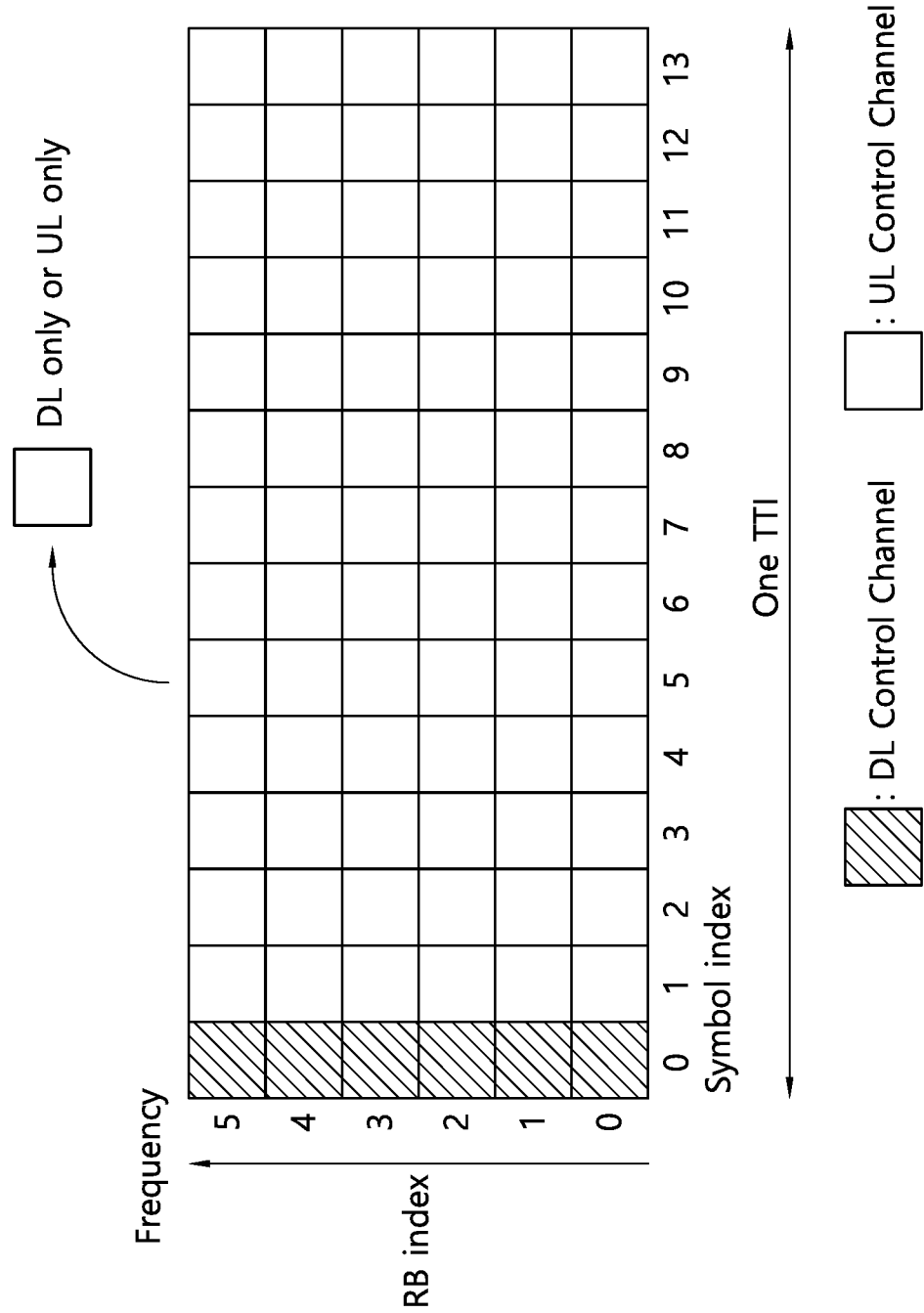
FIG. 5 shows an example of a subframe structure used to minimize latency of data transmission when TDD is used in NR.

FIG. 5 shows an example of a subframe structure used to minimize latency of data transmission when TDD is used in NR. The subframe structure shown in FIG. 5 may be called a self-contained subframe structure.

Referring to FIG. 5, the subframe includes DL control channel in the first symbol, and UL control channel in the last symbol. The remaining symbols may be used for DL data transmission and/or for UL data transmission. According to this subframe structure, DL transmission and UL transmission may sequentially proceed in one subframe. Accordingly, the UE may both receive DL data and transmit UL acknowledgement/non-acknowledgement (ACK/NACK) in the subframe. As a result, it may take less time to retransmit data when a data transmission error occurs, thereby minimizing the latency of final data transmission.

In the self-contained subframe structure, a time gap may be required for the transition process from the transmission mode to the reception mode or from the reception mode to the transmission mode. For this purpose, some symbols at the time of switching from DL to UL in the subframe structure may be set to the guard period (GP).

Figure 6:
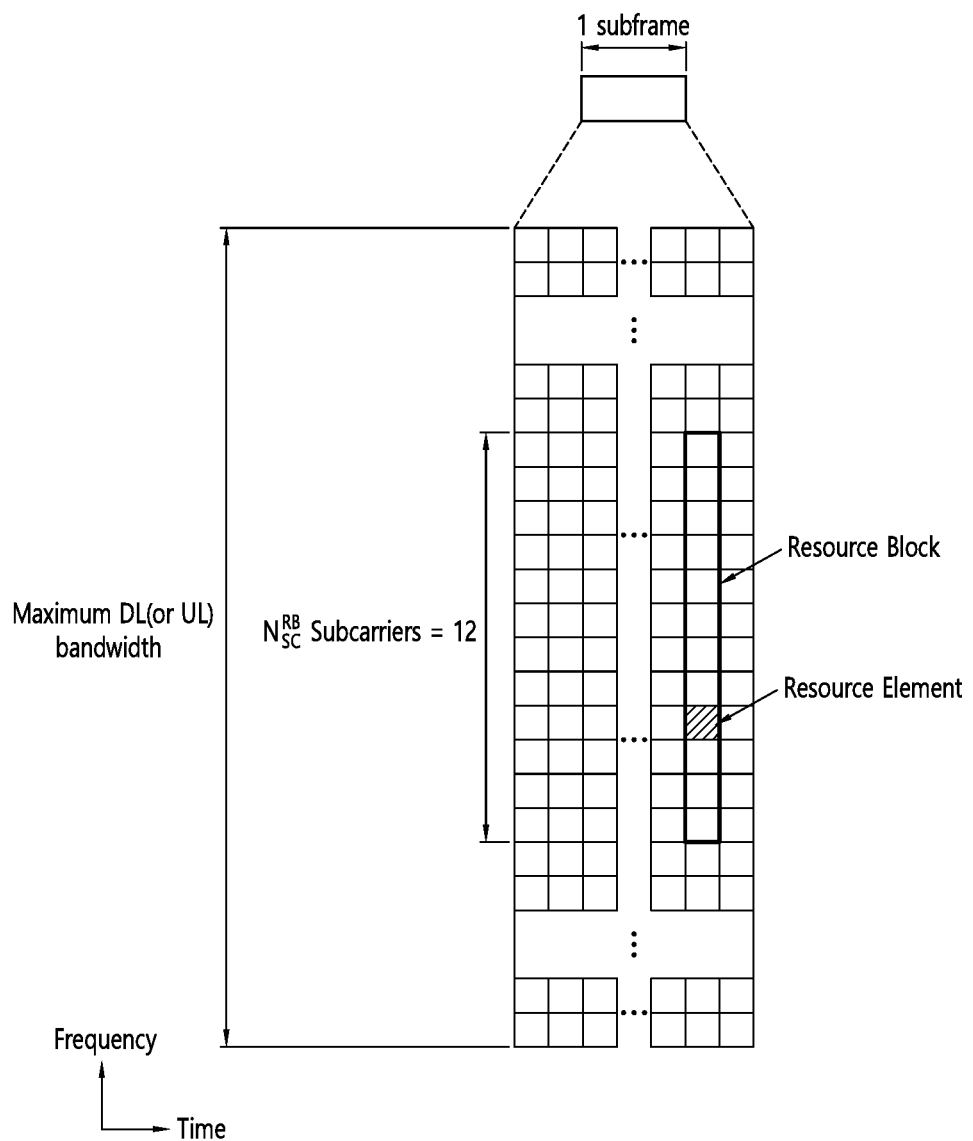
FIG. 6 shows an example of a resource grid to which technical features of the present invention can be applied.

FIG. 6 shows an example of a resource grid to which technical features of the present invention can be applied. An example shown in FIG. 6 is a time-frequency resource grid used in NR. An example shown in FIG. 6 may be applied to UL and/or DL.

Referring to FIG. 6, multiple slots are included within one subframe on the time domain. Specifically, when expressed according to the value of "$\mu$", "$14 \cdot 2^\mu$" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("$\mu$"). The number of allocatable RBs may be configured to the same value for UL and DL, or may be configured to different values for UL and DL.

Hereinafter, a cell search in NR is described.

The UE may perform cell search in order to acquire time and/or frequency synchronization with a cell and to acquire a cell identifier (ID). Synchronization channels such as PSS, SSS, and PBCH may be used for cell search.

Figure 7:
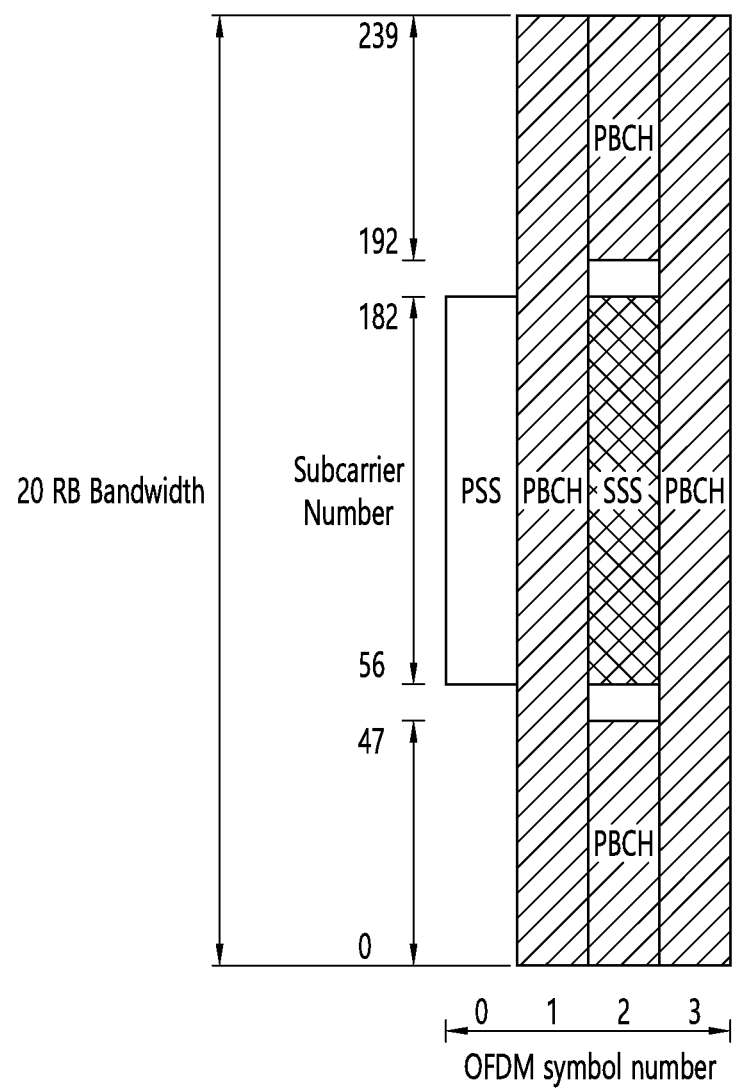
FIG. 7 shows an example of a synchronization channel to which technical features of the present invention can be applied.

FIG. 7 shows an example of a synchronization channel to which technical features of the present invention can be applied. Referring to FIG. 7, the PSS and SSS may include one symbol and 127 subcarriers. The PBCH may include 3 symbols and 240 subcarriers.

The PSS is used for synchronization signal (SS)/PBCH block symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SS/PBCH block may be repeatedly transmitted according to a predetermined pattern within the 5 ms window. For example, when L SS/PBCH blocks are transmitted, all of SS/PBCH block #1 through SS/PBCH block #L may contain the same information, but may be transmitted through beams in different directions. That is, quasi co-located (QCL) relationship may not be applied to the SS/PBCH blocks within the 5 ms window. The beams used to receive the SS/PBCH block may be used in subsequent operations between the UE and the network (e.g. random access operations). The SS/PBCH block may be repeated by a specific period. The repetition period may be configured individually according to the numerology.

Referring to FIG. 7, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SS/PBCH block index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SS/PBCH block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

Hereinafter, DL control channel in NR is described.

The search space for the PDCCH corresponds to aggregation of control channel candidates on which the UE performs blind decoding. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET is a set of resources for control signal transmission. The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

The base station may transmit information on the CORESET to the UE. For example, information on the CORESET configuration may be transmitted for each CORESET. Via the information on the CORESET configuration, at least one of a time duration of the corresponding CORESET (e.g. 1/2/3 symbol), frequency domain resources (e.g. RB set), REG-to-CCE mapping type (e.g. whether interleaving is applied or not), precoding granularity, a REG bundling size (when the REG-to-CCE mapping type is interleaving), an interleaver size (when the REG-to-CCE mapping type is interleaving) and a DMRS configuration (e.g. scrambling ID) may be transmitted. When interleaving to distribute the CCE to 1-symbol CORESET is applied, bundling of two or six REGs may be performed. Bundling of two or six REGs may be performed on the two symbols CORESET, and time first mapping may be applied. Bundling of three or six REGs may be performed on the three symbols CORESET, and a time first mapping may be applied. When REG bundling is performed, the UE may assume the same precoding for the corresponding bundling unit.

In NR, the search space for the PDCCH is divided into CSS and USS. The search space may be configured in CORESET. As an example, one search space may be defined in one CORESET. In this case, CORESET for CSS and CORESET for USS may be configured, respectively. As another example, a plurality of search spaces may be defined in one CORESET. That is, CSS and USS may be configured in the same CORESET. In the following example, CSS means CORESET in which CSS is configured, and USS means CORESET in which USS is configured. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation in NR is described.

In NR, a specific number (e.g. up to 4) of bandwidth parts (BWPs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 8:
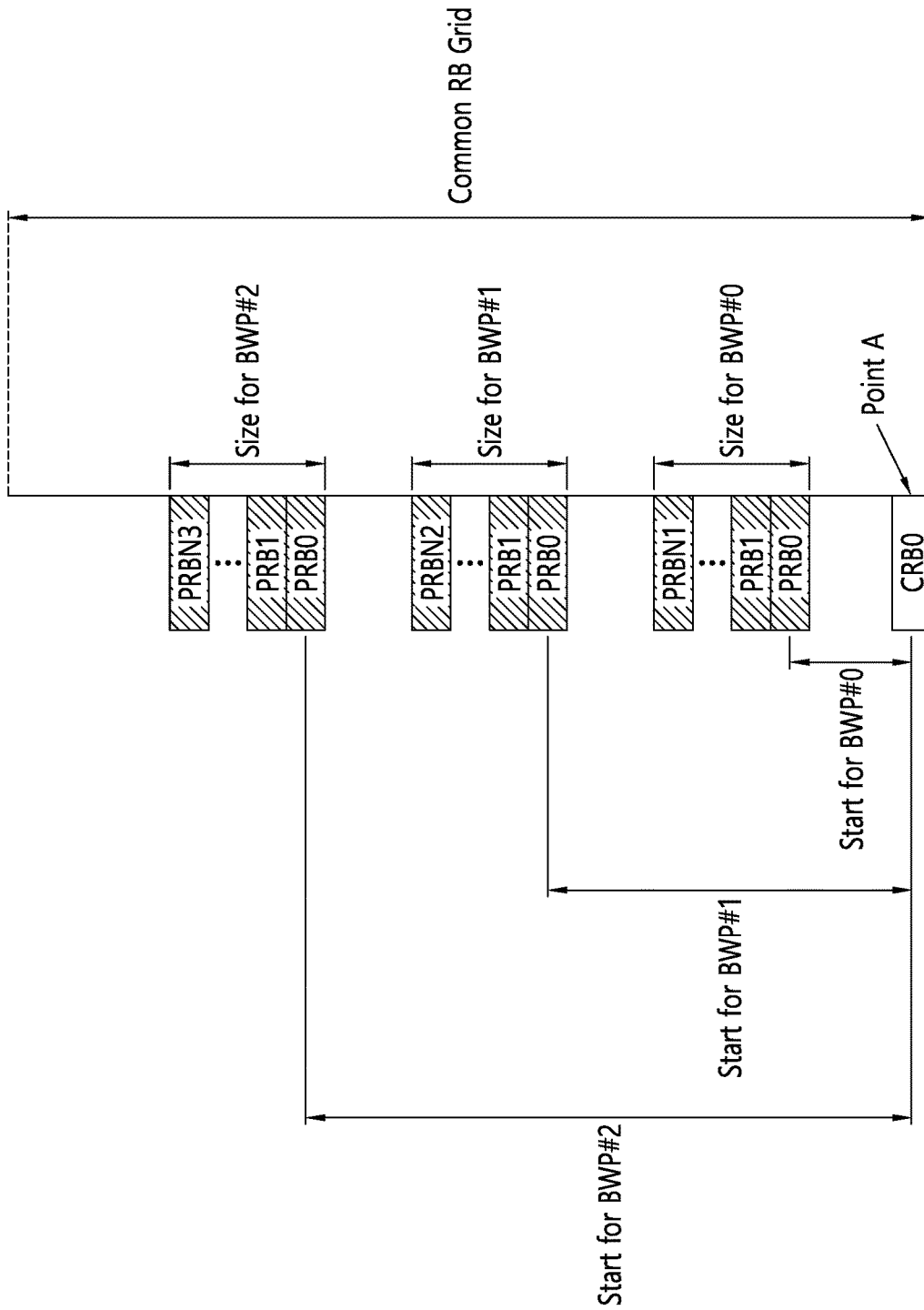
FIG. 8 shows an example of a frequency allocation scheme to which technical features of the present invention can be applied.

FIG. 8 shows an example of a frequency allocation scheme to which technical features of the present invention can be applied. Referring to FIG. 8, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SS/PBCH block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 8 is configured to one cell (e.g. primary cell (PCell)). A plurality of BWPs may be configured for each cell individually or commonly.

Referring to FIG. 8, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g. up to four) of BWPs may be configured for the UE. Even if a plurality of BWPs are configured, only a specific number (e.g. one) of BWPs may be activated per cell for a given time period. However, when the UE is configured with a supplementary uplink (SUL) carrier, maximum of four BWPs may be additionally configured on the SUL carrier and one BWP may be activated for a given time. The number of configurable BWPs and/or the number of activated BWPs may be configured commonly or individually for UL and DL. Also, the numerology and/or CP for the DL BWP and/or the numerology and/or CP for the UL BWP may be configured to the UE via DL signaling. The UE can receive PDSCH, PDCCH, channel state information (CSI) RS and/or tracking RS (TRS) only on the active DL BWP. Also, the UE can transmit PUSCH and/or physical uplink control channel (PUCCH) only on the active UL BWP.

Figure 9:
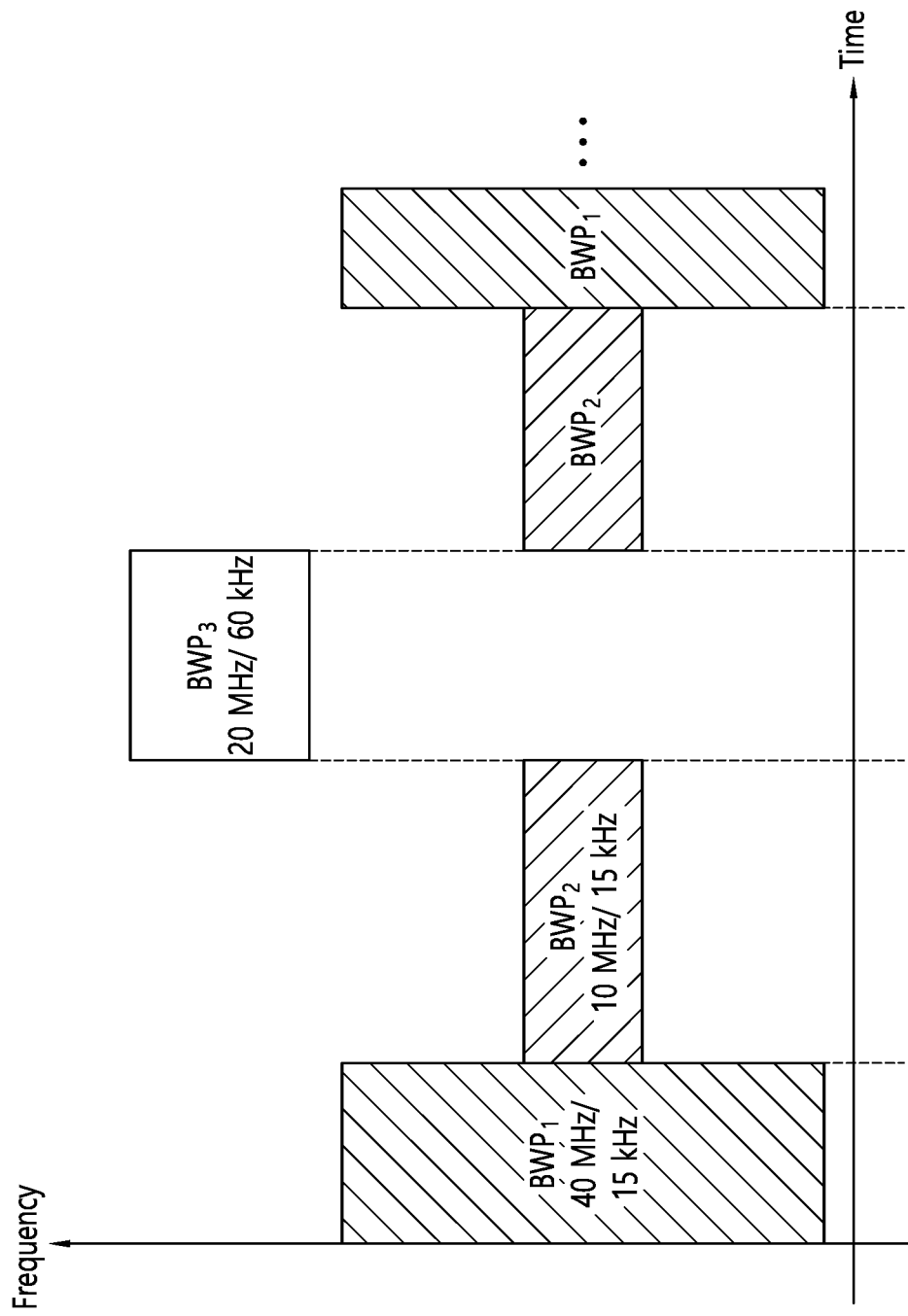
FIG. 9 shows an example of multiple BWPs to which technical features of the present invention can be applied.

FIG. 9 shows an example of multiple BWPs to which technical features of the present invention can be applied. Referring to FIG. 9, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Hereinafter, various embodiments of flexible carrier aggregation proposed by the present application is described.

In NR or LTE, a UE may be configured with multiple carriers when the UE can support multiple carriers. Supporting multiple carriers may be defined as UE's radio frequency (RF) capability (e.g. supporting different frequency carriers simultaneously) and baseband capability (e.g. supporting maximum data rate assuming that all data are scheduled across the configured carriers).

However, supporting multiple carriers may be restrictive. Only if the UE supports both RF capability and baseband capability to support concurrent carriers, a UE may be configured with multiple carriers. When multiple carriers are configured, generally one cell may be mapped to one DL/UL carrier (with exception of supplemental UL (SUL) carrier). With this approach, a UE may be configured with hybrid automatic repeat request (HARQ) processes, and all necessary configuration (including PCmax) may be configured separately per each carrier/cell.

There may be some cases where the above restriction has impact as follows.

(1) Multiple numerologies may be supported by the UE in a network carrier, and the network may perform dynamic frequency division multiplexing (FDM) and/or time division multiplexing (TDM) among different numerologies. One approach to address different numerologies efficiently may be to configure different UE-specific carrier per numerology. In this case, each UE-specific carrier may be overlapped in frequency and/or time domain. When this occurs, in terms of UE peak data rate, multiple carriers with different numerology configured in the same time/frequency should not be counted differently. Alternatively, multiple carriers with different numerology configured in the same time/frequency may be considered as separate carrier, and the maximum bandwidth may be defined per each UE-specific carrier. If carrier and cell are mapped by one-to-one manner, to support multiple numerologies simultaneously, a UE may need to support more data rate than supporting single numerology in a given frequency region.

(2) A UE may be configured with multiple carriers for frequency diversity, and a UE may be only scheduled data to one of the configured carriers at a given time. Particularly for UL where a UE has limited power, even though the UE is configured with multiple carriers, the UE may transmit via only one UL carrier. In that sense, the UE may support multiple carriers in RF capability but the UE may not support higher data rate as in baseband capability.

(3) The network may want to switch PUCCH cell across multiple carriers. This may lead PCell change. To minimize the impact on higher layer, it may be considered to associate multiple carriers as one cell, where carrier change may occur within the cell.

(4) When semi-static DL/UL assignment are configured to a carrier, it may become very challenging to support ultra-reliable and low latency communications (URLLC) traffic due to unavailable DL and/or UL resources in a given time. This may also be addressed by grouping multiple carriers like a single cell and then switching scheduling dynamically among multiple carriers. However, to support this operation, slot offset (and/or symbol offset) may be needed.

(5) The network may operate multiple carriers and each carrier may not be available all the time because of e.g. spectrum sharing with other RATs/services. In this case, from the network perspective, to continue services without interruption, it would be desirable to combine multiple carriers into one and then utilize any carrier among the combined multiple carriers depending on the availability. From the UE perspective, this may be viewed as fast carrier selection where a UE can switch among the combined carriers dynamically. Furthermore, in NR, there is a BWP concept which defines UE-specific subband in a carrier. Similar to this, BWPs across multiple carriers may be switched dynamically via scheduling DCI or media access control (MAC) control element (CE) or other DCI mechanism. Moreover, BWPs across multiple carriers may be switched via RRC signaling as well.

Based on the possible restrictions as discussed above, the followings may be considered.

(1) A cell may be configured with one more carriers. Each carrier may configured with at least one of center frequency, bandwidth, and/or numerology (or TTI or slot length or scheduling unit) for the carrier.

(2) When multiple carriers are configured for a cell, a UE may not be expected to support the higher peak data rate than 'X' Mbps, which is the maximum peak data rate among the configured carriers. In other words, the carriers associated with the single cell may not be scheduled to the maximum peak data rate simultaneously. It means that each carrier in the same frequency may be scheduled by FDM or TDM manner. Thus, the UE may report UE capability for supporting the frequency band with different numerologies as long as the UE supports the maximum peak data rate among possible carriers configurable. In other words, for the different numerologies, the UE may indicate the maximum peak data rate with a numerology among the supported numerologies.

From cross-carrier indication (CIF) perspective, each carrier may be treated as a cell. To differentiate carriers associated with the cell, additional indication may be used. One example of additional indication may be to combine with BWP, where different number of BWPs may be configured to each carrier such that different BWP may indicate different carrier. Another approach may be to use separate field to differentiate different carriers associated with the single cell.

At least when same numerology of carriers are configured with a cell, PUCCH may be indicated in any of carriers dynamically. This may be done by configuring multiple PUCCH resources across carriers and one PUCCH resource may be indicated dynamically. Alternatively, configuration of PUCCH carrier among the associated carriers with PCell may be selected semi-statically.

For HARQ processes, the number of HARQ processes may be configured per cell (maybe UL/DL separately), which may be shared across the carriers with the same cell. By this may, a transport block (TB) scheduled by one carrier may be rescheduled in another carrier as long as they are belonging to the same cell. In terms of 'k0, k1, k2' timing, numerology of scheduled carrier may be used. Further, the timing may also be different per BWP configured in each carrier.

In configuration of default BWP, each carrier associated with single cell may follow one of the following options below.

Option 1: Each carrier associated with single cell may be configured with default BWP in each carrier. One timer may be used per each cell, and all carriers may go to default BWP once the timer expires.

Option 2: Each BWP may be configured with timer separately, and each BWP/carrier may be operated with timer independently.

Option 3: There may be a carrier configured with default BWP, and other carriers may be considered as inactive state when the carrier configured with default BWP changes the BWP to the default BWP. In other words, multiple carriers may be considered as one cell and only one default BWP per cell may be configured. In that case, other numerologies or other carriers may be temporarily in inactive state, and a UE can skip monitoring control channels (and other operations in inactive state such as CSI measurements).

When multiple BWPs are activated in a cell or carrier with multiple numerologies (potentially same or different numerologies), there may be only one default BWP in a cell or carrier, and other numerologies may be disabled and/or may become inactive when the cell switches to the default BWP. Alternatively, there may be default BWP configured per each numerology which may be done by grouping BWPs as a BWP group. BWPs in the BWP group may be changed dynamically via scheduling. In other words, BWPs belonging to the same BWP group may be switched (i.e. TDM) via scheduling DCI and/or timer and/or RRC reconfiguration. For each group of BWPs, there can be a default BWP, and a separate timing can be also applied to each group of BWPs. Each group of BWPs may be considered like a single carrier with single active BWP, and the UE can support multiple active BWPs by having multiple groups of BWPs. One approach to address this may be to configure separate carrier per each group of BWPs. If BWP with different numerology and/or each group of BWPs are treated like different carrier and each carrier is mapped to a cell, operations applied for each carrier may be applied to each group of BWPs. Thus, to support multiple numerologies in the same frequency band, a UE may need to support multiple numerologies as if the UE supports carrier aggregations.

When this approach is used, i.e. a cell may be associated with multiple DL/UL carriers and each carrier may be configured with multiple BWPs and only one active BWP is used per each carrier, the followings may be considered for frequency diversity, CORESET configurations, etc.

(1) At least among carriers with the same numerology and same processing time, any data/control repetition may be configured to be occurred across carriers. For example, if a cell is associated with UL carrier 1 and 2, repetition may occur between UL carrier 1 and 2. One way to support this may be to configure frequency hopping pattern across carriers. Inter-slot and/or inter-mini-slot hopping may occur across carriers.

To support this, same timing advance values may need to be configured to the carriers.

For frequency hopping pattern, one of the offset value may be configured as cross-carrier hopping pattern. If that offset is selected, a UE may assume cross carriers for transmitting UL data.

Similarly for DL, virtual resource block (VRB)-to-PRB mapping may be performed in a union of PRBs of two carriers. From the resource allocation mapping perspective, two carriers may be assumed to be the same carrier. Alternatively, UL Data may be transmitted in different carrier/group of BWPs only between initial and retransmission.

(2) For sounding reference signal (SRS), whether multiple SRSs can be transmitted simultaneously or multiple SRS can be multiplexed by TDM from the carriers associated with the single cell may be configured by the network. Based on the configuration, the UE may perform either simultaneous SRS transmission or SRS transmission multiplexed by TDM among carriers associated with the single cell.

(3) Power control parameters may be configured per each carrier and/or group of BWPs.

(4) In terms of TB scheduling, or simultaneous transmission/reception, as the number of HARQ processes are shared between carriers associated with the single cell, in handling of multiple carriers, TDM (i.e. one transmission of a carrier is assumed) may be used or total transport block size (TBS) scheduled in a given time may be restricted as the maximum of TBS supported by all carriers/group of BWPs.

(5) For PUCCH/PUSCH transmission, different hopping pattern per each PUCCH/PUSCH resource may be configured. For PUCCH, when a UE is configured with multiple PUCCH resource sets, each set may be configured with hopping configuration which includes hopping pattern across carriers. For PUSCH resource sets, each time-domain resource may be configured with hopping configuration which includes hopping pattern across carriers. This is to support that different quality of service (QoS) can utilize different hopping patterns. For example, enhanced mobile broadband (eMBB) data may be occurred within the carrier such that simultaneous transmissions across carriers would occur, whereas URLLC data may enjoy frequency diversity gain across carriers.

(6) Another approach may be to configure different hopping configurations per BWP. Each service may use different BWPs. Each BWP may have the same or different numerology and may be overlapped in frequency.

In this description, the operation per carrier may also be applied to the group of BWPs when multiple BWPs are active per each carrier.

As described above, carriers which can be aggregated/associated with a single cell may be defined as band combination as well. In other words, when the UE reports its capability, for carriers tied together, the UE may report separate capability to support that band as a flexible carrier aggregation framework. For example, a UE may support flexible carrier aggregation of frequency f0 and f1 and f0 may be the main carrier which is defined as a new band. When the UE reports support of the new band, it may imply that multiple carriers can be associated with a single cell and the UE can perform flexible carrier aggregation for the multiple carriers.

Similarly, a new band may be defined per each band as follows.

(1) For a band A (which is already defined in the current band combination), a new band B may be defined and the band B may support multiple numerologies at the same time from a UE perspective. For the new band B, the maximum number of supported numerologies may be defined, and the UE may report how many and/or what numerologies that the UE simultaneously supports in the new band B.

(2) For a given band (which is already defined), the supported (from the network perspective) numerologies (simultaneously) may be specified. The UE may report how many and/or what numerologies that the UE supports simultaneously in that frequency band.

(3) The capability of support of multiple numerologies simultaneously may be different from the capability of support of numerologies which may be multiplexed by TDM. Thus, for TDM and FDM, the supported numerology may be separately indicated.

Multiple active BWPs in a cell is described. Depending on UE capability, even if a UE supports multiple numerologies, the UE may support the multiple numerologies only by TDM and/or FDM and/or TDM/FDM manner Thus, how the UE supports different numerologies along with the supported numerologies should be informed to the network.

When a UE supports the multiple numerologies only by TDM and/or 1-DM manner, the configuration of BWP with different numerologies may need to be constrained. For both approaches, multiple active BWPs may be configured, and each BWP may be associated with different numerologies. However, for TDM, a UE should not be expected to apply more than a single numerology at a given time. This may be assured by the scheduling, and the UE may drop all numerologies or select one numerology when collisions or multiple numerologies occur simultaneously. HARQ processes may be separated between two BWPs (or groups of BWPs) or may be shared. In case of sharing with different numerologies, the number of HARQ processes, and/or the minimum timing may be defined based on the smaller subcarrier spacing.

When multiple active BWPs are configured to a UE for a given cell, a UE may be configured with either FDM operation between multiple active BWPs and/or TDM operation between multiple active BWPs, and/or FDM/TDM operation between multiple active BWPs. The possible configuration may be determined by UE capability.

In operating different modes, different configuration of multiple BWPs and activating BWPs may be considered as follows.

(1) FDM Operation Between Multiple Active BWPs

When FDM operation between multiple active BWPs is supported, semi-static FDM may be used and the size of fast Fourier transform (FFT) for each numerology may be limited. The active BWPs with different numerologies may overlap, yet, the total peak data rate and/or TBS and/or the size of bandwidth per each numerology should not exceed UE capability. When FDM operation between multiple active BWPs is used, it is generally better handling different numerologies independently. One approach may be to configure BWP group and one BWP group may be treated like a carrier. Alternatively, a carrier may be configured with multiple BWPs, and multiple BWPs may be activated concurrently. To support this, for PCell, multiple BWPs may be configured and/or activated In RRC connection setup. For SCell, multiple BWPs may be activated in activation of SCell. When multiple BWPs are configured/activated, changing BWPs may be done as follows.

Multiple BWPs may be paired each other as BWP set, and BWP switching may occur in a BWP set. If any BWP is switched by scheduling, all BWPs in the same BWP set may be switched. In other words, trigger of BWP switching may occur per BWP, and BWP switching may occur per BWP set.

For each BWP, whether it is either associated/configured with CORESET/search space set in the BWP or cross-BWP or cross-carrier scheduling may be configured. Each CORESET/search space may be configured with a set of BWPs which may be self-BWP scheduled or cross-BWP scheduled. Alternatively, there may be separate CORESET/search space configuration per each set of BWPs which may be active at a given time together. For each BWP set, one or more CORESETs which should be included in one or more of BWPs in that BWP set may be configured. As mentioned before, any BWP switching by scheduling DCI in a BWP set may trigger the switching of the whole BWP set to another BWP set.

(2) TDM Operation Between Multiple Active BWPs

When TDM operation between multiple active BWPs is supported, similar to FDM operation, multiple BWPs configuration/activations may be handled. TDM pattern may be handled purely based on scheduling and/or semi-static resource configurations. Alternatively, the TDM pattern may follow single active BWP per carrier where BWPs with different numerologies may be activated/deactivated.

(3) FDM/TDM Operation Between Multiple Active BWPs

Hereinafter, an example of increasing available resource via flexible carrier aggregation according to an embodiment of the present invention is described.

Figure 10:
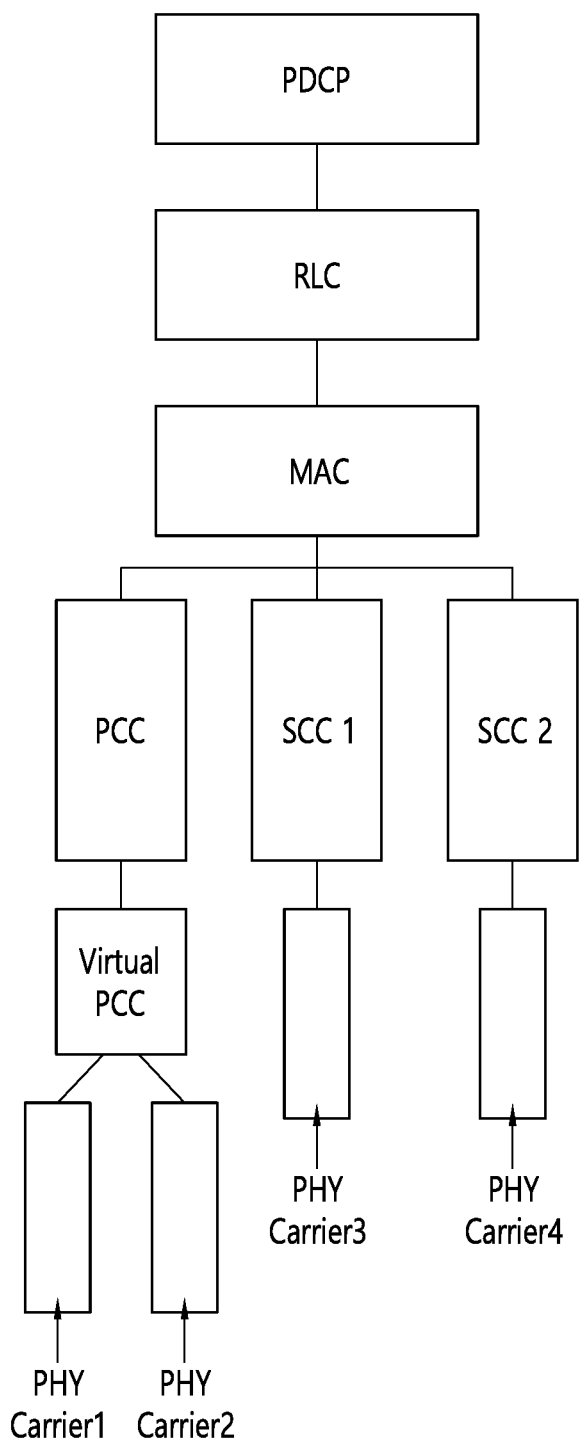
FIG. 10 shows an example of flexible carrier aggregation according to an embodiment of the present invention.

FIG. 10 shows an example of flexible carrier aggregation according to an embodiment of the present invention. Referring to FIG. 10, one PCC and two SCCs (SCC1, SCC2) are configured by MAC layer. Each CC is mapped to a single cell respectively, from higher layer perspective. In other words, there is a single cell for each PCell and SCell from higher layer perspective. On the other hand, there may be multiple carriers for each CC/cell from physical layer perspective. In FIG. 10, physical carrier 1 and physical carrier 2 are associated with a virtual PCC mapped to the PCC, physical carrier 3 is associated with SCC1 and physical carrier 4 is associated with SCC2.

In other words, flexible carrier aggregation means that the conventional carrier aggregation framework is maintain from higher layer perspective (i.e. MAC layer controls serving carriers/cells for carrier aggregation), but physical carriers can be aggregated in a single cell from physical layer perspective. Flexible carrier aggregation may be different from conventional carrier aggregation as follows.

To avoid confusion, carrier may be called as "PHY-carrier".

HARQ process between PHY-carriers belonging to the same cell may be shared. Initial transmission which occurs in one PHY-carrier associated with a cell may occur in another PHY-carrier associated with the cell. The number of HARQ processes supported may be configured per each cell rather than per PHY-carrier.

In terms of scheduling within a cell across multiple PHY-carriers, any CORESET/search space in a PHY-carrier may schedule data in another PHY-carrier associated with the same cell without UE capability and/or configuration of cross-carrier scheduling. In other words, when a UE supports multiple PHY-carriers in a cell, cross-PHY-carrier scheduling and/or cross-HARQ processes should be allowed.

In terms of scheduling a TB and/or transmitting a PUCCH, there may be two approaches as follows.

(1) A TB may be scheduled over only the same PHY-carrier per scheduling. Even in case of multi-slot scheduling and/or multi-mini-slot scheduling, a TB may be transmitted via one PHY-carrier at a time. Selection of PHY-carrier may be dynamically or semi-statically indicated in scheduling.

(2) A TB may be scheduled over multiple PHY-carriers with configuring hopping pattern (when hopping is configured) and/or VRB-to-PRB mapping pattern (when VRB is used) appropriately. Alternatively, a virtual carrier may be constructed, and physical resource of DL and UL may be different depending on the slot index. For example, if LTE TDD DL/UL configuration 0 and LTE TDD DL/UL configuration 1 is used, a virtual carrier may be formed by flexibly aggregating two carriers with LTE TDD DL/UL configuration 0 and 1 with slot/subframe offset. The carrier with TDD DL/UL configuration 1 may be shifted by 3 slot/subframe offset such that there may be DL slot/subframe in most occasions. For the virtual carrier, the DL resource may come from CC1 in slot 0, from CC1 in slot 1, from CC2 in slot 2, from CC2 in slot 3, from CC2 in slot 4, and the pattern may be repeated in 5 ms. Two special subframes may be treated as DL slot/subframe with some portions are rate matched for data transmission.

FIG. 11 shows an example of supporting URLLC in TDD by flexible carrier aggregation according to an embodiment of the present invention. Referring to FIG. 11, PHY-carrier 1 and PHY-carrier 2 may be associated with a single cell from the higher layer perspective. As it may be viewed as FDD or paired spectrum since there may always be available DL and/or UL resources, from HARQ-timing perspective, FDD HARQ timing may be used. This implies that PUCCH may be transmitted at n+4 subframe/slot if legacy TTI is used (or n+6 subframe/slot if short TTI (sTTI) with 2 OFDM symbols is used), and/or PUSCH may be transmitted at n+4 subframe/slot if legacy TTI is used (or n+6 subframe/slot if sTTI with 2 OFDM symbols is used). It is a bit challenging in physical HARQ indicator channel (PHICH) timing due to multiplexing with legacy UEs, and collision may occur in PHICH resources. Thus, when this operation is used, even with legacy TTI operation, asynchronous HARQ operation without PHICH may be used. For PUSCH retransmission & HARQ-ACK, grant-based retransmission may be supported as default operation.

When multi-slot scheduling and/or multi-mini-slot scheduling is used, it may continue over the virtual carrier regardless of where the physical resource is present.

In terms of power control and/or power headroom reporting (PHR), separate power control for PHY-carrier 1 and PHY-carrier 2 may be used. Transmit power command (TPC) may also be transmitted separately by explicit indication. Thus, it may need to be indicated in TPC for which PHY-carrier the TPC is applied. Alternatively, the same TPC is used and power offset between PHY-carriers may be configured.

If the virtual carrier has unavailable resources either in DL or UL, it may be considered as unavailable, and the UE may skip or postpone transmission in such unavailable resources. To maximize transmission opportunities, it may be considered to postpone in such unavailable resources instead of skipping. For example, if there is no UL resources, PUCCH transmission may be postponed to the next available UL resource and multiple DL resource may be mapped to the same UL resource. In such case, the multiple HARQ-ACK for multiple DL transmissions may be aggregated.

Figure 12:
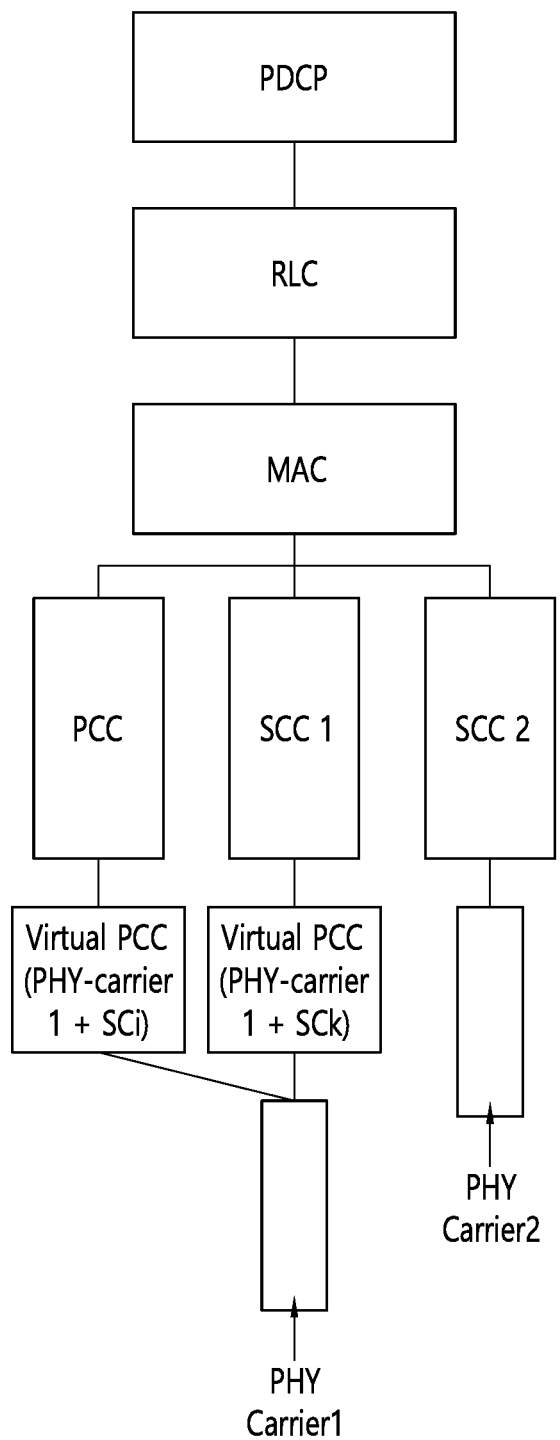
FIG. 12 shows another example of flexible carrier aggregation according to an embodiment of the present invention.

FIG. 12 shows another example of flexible carrier aggregation according to an embodiment of the present invention. FIG. 12 show a case of flexible carrier aggregation for multiple numerologies. Referring to FIG. 12, one PCC and two SCCs (SCC1, SCC2) are configured by MAC layer. Each CC is mapped to a single cell respectively, from higher layer perspective. In other words, there is a single cell for each PCell and SCell from higher layer perspective. From physical layer perspective, physical carrier 1 with subcarrier spacing i is associated with a virtual PCC mapped to the PCC, physical carrier 1 with subcarrier spacing k is associated with the virtual PCC mapped to the SCC1, and physical carrier 2 is associated with SCC2. Physical carrier may include multiple active BWPs with different numerologies, and each active BWP with different numerologies may be associated with different cells, respectively.

Figure 13:
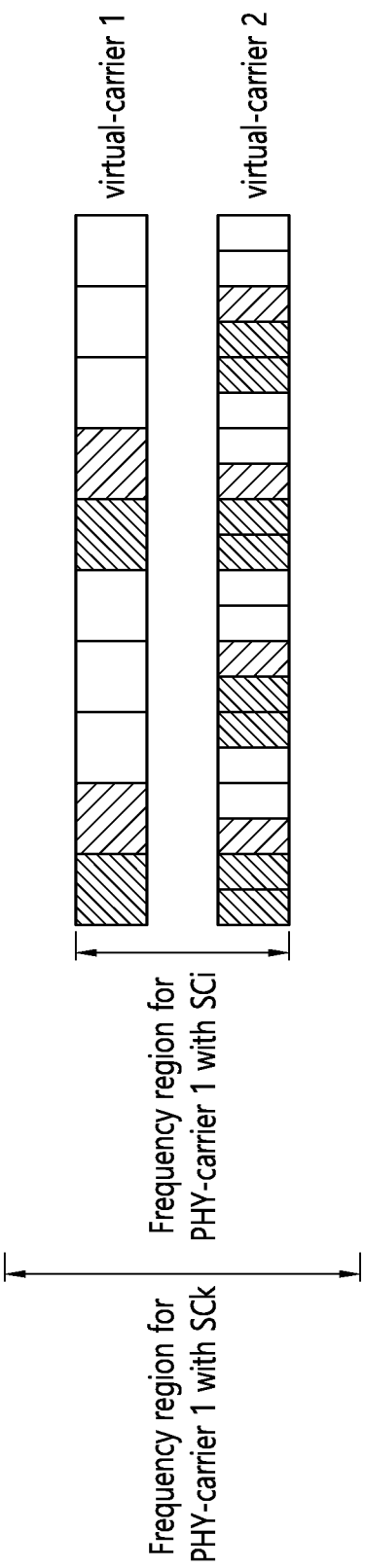
FIG. 13 shows an example of frequency region of physical carrier configured by flexible carrier aggregation according to an embodiment of the present invention.

FIG. 13 shows an example of frequency region of physical carrier configured by flexible carrier aggregation according to an embodiment of the present invention.

Approach for multiple BWP case may be different from approach for TDD URLLC case described above. In this case, there may be a (physical) carrier which consists of center frequency and frequency region. However, when the UE supports multiple numerologies in the same frequency region, it may be viewed as overlapped cells in the same frequency. So, one easy example may be to configure separate cell for each physical carrier+numerology used in that carrier. This may be particularly useful when FDM operation between numerologies is used. As each numerology support potentially different bandwidth, different bandwidth may be configured per each numerology.

Given that multiple cells may be overlapped physically, it may be useful to share some of tracking, synchronization aspects, radio link monitoring (RLM) aspects, etc. To support this, a SCell may be indicated that the SCell may acquire tracking, synchronization (e.g. coarse time/frequency synchronization) from another cell. If not configured, the SCell may acquire tracking and/or synchronization from PCell and/or the primary cell in the carrier group. Also, serving cell measurements may be skipped for the SCell. This type of SCell may be called as dependent SCell. The dependent SCell may only be used for transmitting control/data such that other functions (e.g. RLM/radio resource management (RRM)/beam tracking/etc.) may follow the associated cell (e.g. indicated cell or PCell). If this approach is used, TB may be scheduled independently per each cell, and the HARQ may not be shared between cells. Discontinuous reception (DRX) may be configured separately per each cell. Regarding control/data handling, the dependent SCell may be considered as separate cell from the associated cell.

In summary, the proposed approach may be to define different mappings between physical carrier and logical/virtual carrier depending on use cases. In some cases, one logical/virtual carrier may consist of single physical carrier and/or multiple physical carriers (as shown in FIG. 10 above). In some other cases, one physical carrier may be associated with one or more logical/virtual carriers (as shown in FIG. 12 above). Depending on the mapping, a UE may be switched over multiple physical carriers dynamically and/or different numerologies may be formed in an overlaid manner in the same physical carrier.

Regarding flexible carrier aggregation, the followings may be further considered.

(1) Semi-Static DL/UL Configuration

When multiple physical carriers are mapped to a single logical/virtual carrier/cell, and if the mapping is cell-specific, semi-static DL/UL configuration may be given for each logical/virtual carrier/cell. For example, in case of spectrum sharing, the network may configure a logical/virtual carrier/cell over multiple physical carriers, and a common semi-static DL/UL configuration may be applied to the multiple physical carriers. Another approach may be to transmit semi-static DL/UL configuration per each physical carrier. If one physical carrier is mapped to multiple logical/virtual carriers/cells, a UE may be expected to receive only one or separate semi-static DL/UL configuration per each logical carrier as different unknown portions can be indicated. One approach may be to configure semi-static DL/UL configuration per each logical/virtual carrier/cell and DL/UL assignment may be done based on the numerology of the logical/virtual carrier/cell. A UE may be configured with the same slot format indication (SFI) or semi-static DL/UL configuration for multiple logical/virtual carriers/cells. For example, when multiple logical/virtual carriers/cells are configured due to different numerologies, the same format may be used across the different numerologies. In such a case, the numerology indicated with semi-static DL/UL configuration may be used for representing/interpreting the DL/UL assignment which are applied to each numerology based on each numerology's slot/symbol duration.

(2) Dynamic Group Common PDCCH and/or SFI Transmission

Similar handling to semi-static DL/UL configuration may also be considered for group common PDCCH and/or SFI transmission.

(3) Energy Saving Mechanisms

When multiple physical carriers are mapped to a single logical/virtual carrier/cell, a UE may need to maintain (semi-) active states in all physical carriers to support dynamic switching among multiple physical carriers. The (semi-)active state in a physical carrier may be defined as follows.

A UE's RF may be active in the carrier such that the UE can transmit data via the carrier any time.

CSI feedback on the carrier may be at least aperiodically transmitted such that the network knows basic CSI feedbacks. Alternatively, at least RRM measurements and/or reference signal (RS) signal to interference and noise ratio (SINR) measurements may be available in the carrier so that the network can schedule data without asking CSI feedback before data scheduling. To support this, an inactive state may be introduced which is different from deactivated state. Deactivated state may refer the state where the UE can turn off the RF/baseband. In inactive state, a UE needs to perform necessary measurements such as CSI feedback, SRS transmission, etc., but the UE is not required to monitor control/data. Thus, only measurement related logics may be enabled in inactive state.

A UE may be configured with multiple physical carrier groups. The physical carrier group may be different from a logical carrier or may be same as logical carrier. In a physical carrier group, it may be expected that a UE operates with single baseband/RF component regardless of frequency change. For example, if f1 and f2 are physical carriers, and the UE operates in f1 and f2 with the same RF and one baseband, f1 and f2 may be configured as a physical carrier group. In a physical carrier group, a UE may not be expected to perform measurement in more than one frequency at a given time. Furthermore, in terms of RF reception, a UE may not be expected to receive in both f1 and f2 at the same time. Thus, a UE cannot be configured with active carrier and inactive carrier simultaneously within the same physical carrier group. In other words, only one (if any, i.e. at most one) carrier may be inactive or active per each physical carrier group. This may be dependent on UE's RF capability. Thus, a UE may report its capability on simultaneous handling across multiple physical carriers such that the network can group them appropriately.

When inactive state is introduced, state of the carrier state may be turned to inactive state to reduce UE power consumption. Inactive state may be configured per DL carrier and/or UL carrier, respectively. Trigger of inactive state may be done as follows. In SCell, if default timer expires on the primary BWP group, the SCell may go to inactive state. The primary BWP group may be defined implicitly (e.g. BWP group may contain autonomously activated BWP). For other BWP group, that BWP group (or the carrier) may go to inactive state. In other words, when default timer expires simultaneously across multiple BWP groups, different behaviors may be used depending on BWP group or depending on PCell or SCell. For example, timer on PCell may lead SCell state as inactive state.

A UE may be indicated by (UE-specific or group-specific) DCI about the SFI information. SFI information which can overwrite SFI information in group common PDCCH may indicate unknown resource and/or reserved resource. One drawback of this approach is that measurements may also be canceled. For this purpose, the measurement may follow SFI information in group common PDCCH, whereas data/control monitoring/reception/transmission may follow UE-specific or separate SFI information/indication. The DCI may contain at least one of start time and/or duration for the unknown resource, or information on 'no control/data monitoring' time duration. After that time, a UE may resume its monitoring on control/data. During this time, a UE may monitor cross-carrier scheduling from another cell and/or PCell (where candidates for cross-carrier scheduling is very limited) to wake up SCell/inactive BWP group. In other words, a UE may be configured with a cross-carrier scheduling which will be active only when the scheduled carrier becomes inactive state. This cross-carrier configuration may configure very limited number of blind detection candidates. This capability may be associated with support of inactive state. Thus, when a UE supports inactive state, supporting minimum set of cross-carrier scheduling may be mandated. When cross-carrier scheduling is triggered, a UE may switch to active state on that carrier/BWP group.

To save energy particularly on PCell, blind detection candidates may be reduced by dynamic trigger. For example, once a DCI is triggered, blind detection candidates may be reduced to a certain percentage and/or the reduced blind detection candidates may be separately configured and such configuration may become active. For the configuration of the reduced blind detection candidates, the followings may be considered.

Multiple sets of blind detection candidates may be configured per each search space set associated with a CORESET One configuration may be activated/deactivated based on DCI and/or MAC CE and/or RRC The applied configuration may be changed automatically based on timer and/or may be triggered if certain time passes once a UE stays in default BWP (i.e. further reduced power saving in default BWP).

The configuration of the reduced blind detection candidates may be activated in inactive state of the cell The configuration of the reduced blind detection candidates may include zero-candidate in the cell, and may include limited number of cross-carrier candidates. To support this, a set of search space and/or CORESET for cross-carrier scheduling may also be configured for the scheduled BWP/carrier's CORESET. In other words, one of configuration of blind detection candidates may include cross-carrier and/or cross-BWP candidates. This may be effective, e.g. when scheduled carrier/BWP becomes inactive state, and wakes up. If scheduling carrier is inactive/deactivated, even if the configuration is indicated cross-carrier/BWP, a UE may not be required to monitor blind detection candidates.

(4) Carrier Activation/Deactivation

When multiple logical/virtual carriers/cells are configured which may share the physical carrier, activation/deactivation of such multiple logical/virtual carriers/cells should be further clarified. For example, in SCell configuration, separate RRM measurements and/or SIB transmissions may be assumed. In terms of RRM measurements, as multiple logical/virtual carriers/cells shares the same physical carrier, a logical/virtual carrier/cell without RRM measurement may be configured. Though the network may configure separate RRM measurement configurations to each logical/virtual carrier/cell, some of RRM measurements may be omitted in some of logical/virtual carriers/cells. So in this case, it may be desirable to define primary/master carrier/cell among the multiple logical/virtual carriers/cells, and if RRM measurements on that primary/master carrier/cell becomes poor so that logical/virtual carrier/cell may be released/deactivated or handed over, all the associated logical/virtual carrier/cells may also be deactivated automatically. For example, RLM may be triggered only on the primary/master carrier/cell and RLM may become effective on all logical/virtual carriers/cells sharing the same primary/master physical carrier. In terms of SIB information, information carried for master/primary carrier/cell may also be applied to other logical/virtual carriers/cells sharing the same primary/master physical carrier. This may be done by the following alternatives.

A carrier may be configured as {frequency, reference numerology}, and BWP group with the reference numerology may be primary/master carrier and/or master/primary BWP group. A carrier may have multiple BWP groups, and each BWP group may be associated with a numerology. RLM/RRM/handover/SIB update may occur for each carrier. BWP group may perform independent activation/deactivation, even though there is always one active BWP with the reference numerology indicated for the carrier. In addition to the default active BWP group, other BWP groups may be configured additionally. However, if default active BWP group becomes deactivated, all other BWP groups may also be deactivated. In other words, for the cell activation/deactivation, BWP group containing the first automatically activated BWP may be considered as master/primary BWP group.

A carrier may be configured as {frequency, numerology} and BWPs belonging to the carrier may use the numerology of the carrier. DL and UL carrier may be configured separately. This is the approach of logical carrier on the same physical carrier. In such a case, RLM/RRM/handover/SIB-update may occur independently, or such operation may occur in master/primary carrier. If carrier grouping is considered, it is generally better to consider a carrier with multiple BWP groups. Thus, when this approach is used, it may be desirable to assume separate RLM/RRM/activation/deactivation/measurement/handover/SIB update. This may be inefficient, thus, when this approach is used, the configuration may indicate that some or all of such functionalities can be inherited from another cell/carrier. For example, activation may be bundled among multiple carriers, RRM measurement may be based on another carrier, etc.

(5) Fast Carrier Activation/Deactivation (e.g. Dynamic Signaling)

Figure 14:
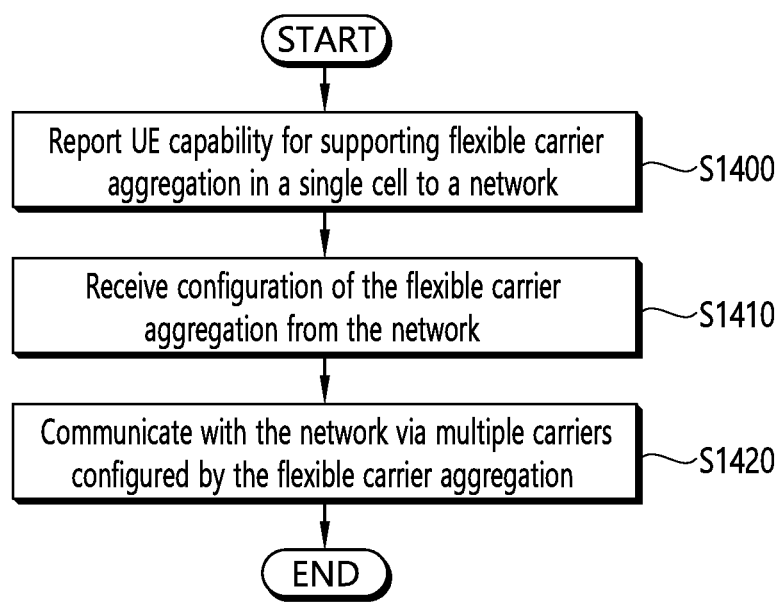
FIG. 14 shows a method for supporting flexible carrier aggregation by a UE according to an embodiment of the present invention.

FIG. 14 shows a method for supporting flexible carrier aggregation by a UE according to an embodiment of the present invention. The present invention described above for UE side may be applied to this embodiment.

In step S1400, the UE reports UE capability for supporting a flexible carrier aggregation in a single cell to a network. In step S1410, the UE receives a configuration of the flexible carrier aggregation from the network. In step S1420, the UE communicates with the network via multiple physical carriers configured by the flexible carrier aggregation. The multiple physical carriers are mapped to the single cell by the flexible carrier aggregation.

A HARQ process may be shared between the multiple physical carriers. A control resource set and/or search space in a physical carrier among the multiple physical carriers may schedule data in another physical carrier among the multiple physical carriers. A transport block may be scheduled over only a same physical carrier among the multiple physical carriers. Alternatively, a transport block may be scheduled over the multiple physical carriers with a hopping pattern and/or a VRB-to-PRB mapping pattern. Separate power control may be applied for each of the multiple physical carriers.

Meanwhile, one physical carrier among the multiple physical carriers may be mapped to a multiple cells.

According to embodiment of the present invention shown in FIG. 14, without impacting carrier aggregation framework from higher layer perspective, multiple physical carriers can be flexibly aggregated from physical layer perspective. Therefore, resource can be utilized efficiently.

Figure 15:
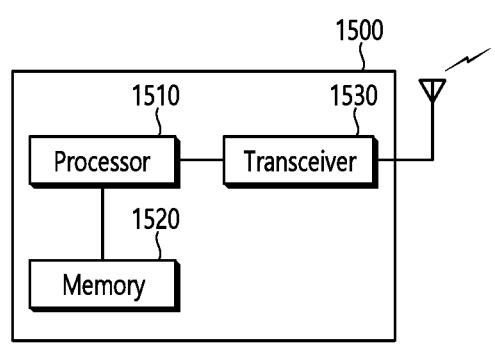
FIG. 15 shows a UE to implement an embodiment of the present invention.

FIG. 15 shows a UE to implement an embodiment of the present invention. The present invention described above for UE side may be applied to this embodiment.

A UE 1500 includes a processor 1510, a memory 1520 and a transceiver 1530. The processor 1510 may be configured to implement proposed functions, procedures and/or methods described in this description. Layers of the radio interface protocol may be implemented in the processor 1510. Specifically, the processor 1510 controls the transceiver 1530 to report UE capability for supporting a flexible carrier aggregation in a single cell to a network, controls the transceiver 1530 to receive a configuration of the flexible carrier aggregation from the network, and controls the transceiver 1530 to communicate with the network via multiple carriers configured by the flexible carrier aggregation. The multiple carriers are mapped to the single cell by the flexible carrier aggregation.

A HARQ process may be shared between the multiple physical carriers. A control resource set and/or search space in a physical carrier among the multiple physical carriers may schedule data in another physical carrier among the multiple physical carriers. A transport block may be scheduled over only a same physical carrier among the multiple physical carriers. Alternatively, a transport block may be scheduled over the multiple physical carriers with a hopping pattern and/or a VRB-to-PRB mapping pattern. Separate power control may be applied for each of the multiple physical carriers.

Meanwhile, one physical carrier among the multiple physical carriers may be mapped to a multiple cells.

The memory 1520 is operatively coupled with the processor 1510 and stores a variety of information to operate the processor 1510. The transceiver 1530 is operatively coupled with the processor 1510, and transmits and/or receives a radio signal.

The processor 1510 may include application-specific integrated circuit (ASIC), other chipset, logic circuit and/or data processing device. The memory 1520 may include read-only memory (ROM), random access memory (RAM), flash memory, memory card, storage medium and/or other storage device. The transceiver 1530 may include baseband circuitry to process radio frequency signals. When the embodiments are implemented in software, the techniques described herein can be implemented with modules (e.g., procedures, functions, and so on) that perform the functions described herein. The modules can be stored in the memory 1520 and executed by the processor 1510. The memory 1520 can be implemented within the processor 1510 or external to the processor 1510 in which case those can be communicatively coupled to the processor 1510 via various means as is known in the art.

According to embodiment of the present invention shown in FIG. 15, without impacting carrier aggregation framework from higher layer perspective, multiple physical carriers can be flexibly aggregated from physical layer perspective. Therefore, resource can be utilized efficiently.

Figure 16:
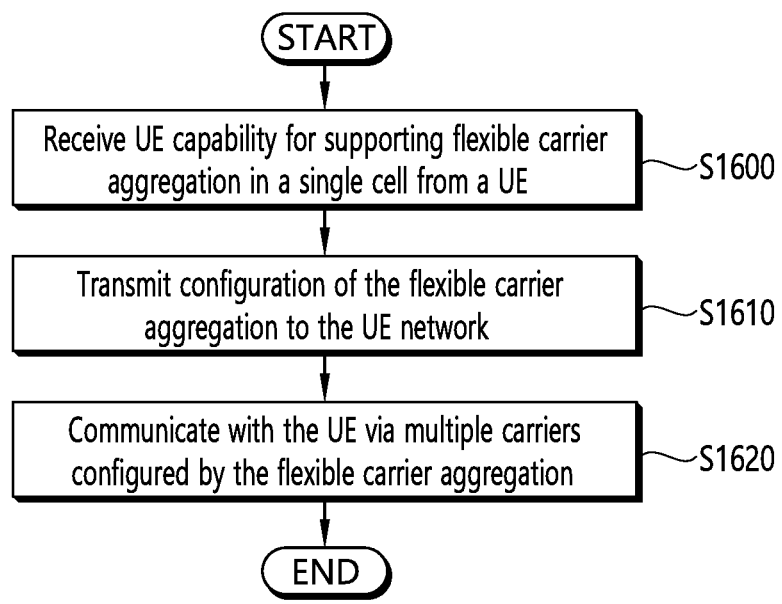
FIG. 16 shows a method for supporting flexible carrier aggregation by a BS according to an embodiment of the present invention.

FIG. 16 shows a method for supporting flexible carrier aggregation by a BS according to an embodiment of the present invention. The present invention described above for BS side may be applied to this embodiment.

In step S1600, the BS receives UE capability for supporting a flexible carrier aggregation in a single cell from a UE. In step S1610, the BS transmits a configuration of the flexible carrier aggregation to the UE. In step S1620, the BS communicates with the UE via multiple physical carriers configured by the flexible carrier aggregation. The multiple physical carriers are mapped to the single cell by the flexible carrier aggregation.

A HARQ process may be shared between the multiple physical carriers. A control resource set and/or search space in a physical carrier among the multiple physical carriers may schedule data in another physical carrier among the multiple physical carriers. A transport block may be scheduled over only a same physical carrier among the multiple physical carriers. Alternatively, a transport block may be scheduled over the multiple physical carriers with a hopping pattern and/or a VRB-to-PRB mapping pattern. Separate power control may be applied for each of the multiple physical carriers.

Meanwhile, one physical carrier among the multiple physical carriers may be mapped to a multiple cells.

According to embodiment of the present invention shown in FIG. 16, without impacting carrier aggregation framework from higher layer perspective, multiple physical carriers can be flexibly aggregated from physical layer perspective. Therefore, resource can be utilized efficiently.

Figure 17:
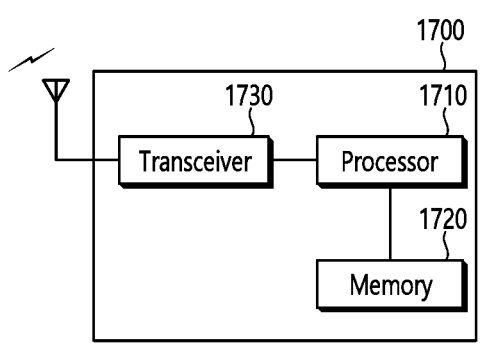
FIG. 17 shows a BS to implement an embodiment of the present invention.

FIG. 17 shows a BS to implement an embodiment of the present invention. The present invention described above for BS side may be applied to this embodiment.

A BS 1700 includes a processor 1710, a memory 1720 and a transceiver 1730. The processor 1710 may be configured to implement proposed functions, procedures and/or methods described in this description. Layers of the radio interface protocol may be implemented in the processor 1710. Specifically, the processor 1710 controls the transceiver 1730 to receive UE capability for supporting a flexible carrier aggregation in a single cell from a UE, controls the transceiver 1730 to transmit a configuration of the flexible carrier aggregation to the UE, and controls the transceiver 1730 to communicate with the UE via multiple carriers configured by the flexible carrier aggregation. The multiple carriers are mapped to the single cell by the flexible carrier aggregation.

A HARQ process may be shared between the multiple physical carriers. A control resource set and/or search space in a physical carrier among the multiple physical carriers may schedule data in another physical carrier among the multiple physical carriers. A transport block may be scheduled over only a same physical carrier among the multiple physical carriers. Alternatively, a transport block may be scheduled over the multiple physical carriers with a hopping pattern and/or a VRB-to-PRB mapping pattern. Separate power control may be applied for each of the multiple physical carriers.

Meanwhile, one physical carrier among the multiple physical carriers may be mapped to a multiple cells.

The memory 1720 is operatively coupled with the processor 1710 and stores a variety of information to operate the processor 1710. The transceiver 1730 is operatively coupled with the processor 1710, and transmits and/or receives a radio signal.

The processor 1710 may include ASIC, other chipset, logic circuit and/or data processing device. The memory 1720 may include ROM, RAM, flash memory, memory card, storage medium and/or other storage device. The transceiver 1730 may include baseband circuitry to process radio frequency signals. When the embodiments are implemented in software, the techniques described herein can be implemented with modules (e.g., procedures, functions, and so on) that perform the functions described herein. The modules can be stored in the memory 1720 and executed by the processor 1710. The memory 1720 can be implemented within the processor 1710 or external to the processor 1710 in which case those can be communicatively coupled to the processor 1710 via various means as is known in the art.

According to embodiment of the present invention shown in FIG. 17, without impacting carrier aggregation framework from higher layer perspective, multiple physical carriers can be flexibly aggregated from physical layer perspective. Therefore, resource can be utilized efficiently.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
reporting UE capability for supporting a flexible carrier aggregation to a network;
receiving a configuration for the flexible carrier aggregation from the network; and
communicating with the network via multiple physical carriers configured by the flexible carrier aggregation,
wherein the multiple physical carriers include a first physical carrier, a second physical carrier, and a third physical carrier,
wherein the first physical carrier and the second physical carrier are mapped to a single cell by the flexible carrier aggregation, and the third physical carrier is mapped to another single cell,
wherein the first physical carrier and the second physical carrier are discontinuous,
wherein a hybrid automatic repeat request (HARQ) process is shared between the first physical carrier and the second physical carrier, and another HARQ process is applied to the third physical carrier,
wherein a transport block is scheduled over the first physical carrier and the second physical carrier with (i) a hopping pattern or (ii) a virtual resource block (VRB) to physical resource block (PRB) mapping pattern, and
wherein separate power control is applied for the first physical carrier and the second physical carrier.

2. The method of claim 1, wherein a control resource set or search space in a physical carrier among the multiple physical carriers schedules data in another physical carrier among the multiple physical carriers.

3. The method of claim 1, wherein the UE is in communication with at least one of a mobile device, a network, and/or autonomous vehicles other than the UE.

4. A user equipment (UE) in a wireless communication system, the UE comprising:
a memory;
a transceiver; and
a processor, operably coupled to the memory and the transceiver, that is configured to:
control the transceiver to report UE capability for supporting a flexible carrier aggregation to a network, control the transceiver to receive a configuration for the flexible carrier aggregation from the network, and
control the transceiver to communicate with the network via multiple carriers configured by the flexible carrier aggregation,
wherein the multiple carriers include a first physical carrier, a second physical carrier, and a third physical carrier,
wherein the first physical carrier and the second physical carrier are mapped to a single cell by the flexible carrier aggregation, and the third physical carrier is mapped to another single cell,
wherein the first physical carrier and the second physical carrier are discontinuous,
wherein a hybrid automatic repeat request (HARQ) process is shared between the first physical carrier and the second physical carrier, and another HARQ process is applied to the third physical carrier,
wherein a transport block is scheduled over the first physical carrier and the second physical carrier with (i) a hopping pattern or (ii) a virtual resource block (VRB) to physical resource block (PRB) mapping pattern, and
wherein separate power control is applied for the first physical carrier and the second physical carrier.

5. A method performed by a base station (BS) in a wireless communication system, the method comprising:
receiving user equipment (UE) capability for supporting a flexible carrier aggregation from a UE;
transmitting a configuration for the flexible carrier aggregation to the UE; and
communicating with the UE via multiple physical carriers configured by the flexible carrier aggregation,
wherein the multiple physical carriers include a first physical carrier, a second physical carrier, and a third physical carrier,
wherein the first physical carrier and the second physical carrier are mapped to a single cell by the flexible carrier aggregation, and the third physical carrier is mapped to another single cell,
wherein the first physical carrier and the second physical carrier are discontinuous,
wherein a hybrid automatic repeat request (HARQ) process is shared between the first physical carrier and the second physical carrier, and another HARQ process is applied to the third physical carrier,
wherein a transport block is scheduled over the first physical carrier and the second physical carrier with (i) a hopping pattern or (ii) a virtual resource block (VRB) to physical resource block (PRB) mapping pattern, and
wherein separate power control is applied for the first physical carrier and the second physical carrier.

6. The method of claim 5, wherein a control resource set or search space in a physical carrier among the multiple physical carriers schedules data in another physical carrier among the multiple physical carriers.

* * * * *